A. SCHNEIDER.
BELT HOOK.
APPLICATION FILED JAN. 18, 1915.

1,163,780.

Patented Dec. 14, 1915.

Witnesses
Howard H. Yarrington
Mae Parkin

Inventor
Adolph Schneider
By Moulton & Liverance
Attorneys.

COLUMBIA PLANOGRAPH CO., WASHINGTON, D. C.

UNITED STATES PATENT OFFICE.

ADOLPH SCHNEIDER, OF GRAND RAPIDS, MICHIGAN.

BELT-HOOK.

1,163,780.  Specification of Letters Patent.  Patented Dec. 14, 1915.

Application filed January 18, 1915.  Serial No. 2,916.

*To all whom it may concern:*

Be it known that I, ADOLPH SCHNEIDER, a citizen of the United States of America, residing at Grand Rapids, in the county of Kent and State of Michigan, have invented certain new and useful Improvements in Belt-Hooks; and I do hereby declare the following to be a full, clear, and exact description of the invention, such as will enable others skilled in the art to which it appertains to make and use the same.

This invention relates to new and useful improvements in belt hooks of that type in which double pointed hooks are used upon the opposite sides of the ends of a belt and secured thereto, and it is the object and purpose of this invention to provide a belt hook of this character which may be attached to the ends of a belt in a manner such that its detachment is practically impossible without a rupture of the belt fabric, the hook when once attached having parts interconnected and practically locked against removal from the belt as has heretofore occurred in standard belt hooks due to the bending of certain portions of the hook embedded in the belt. By reason of the structure and the method of attachment of these hooks a less number may be employed in connecting the ends of belting and there is no liability of the hooks becoming disengaged and dropping from the belt during its use.

Figure 1:
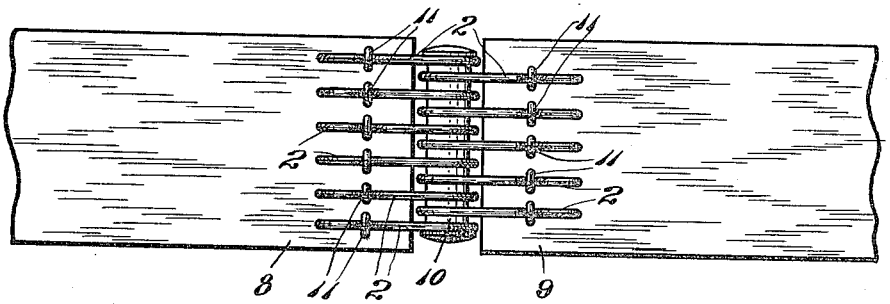
Figure 2:
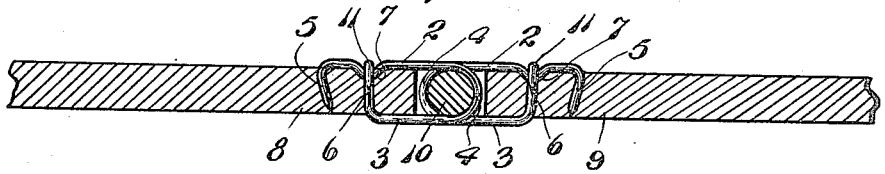
Figure 3:
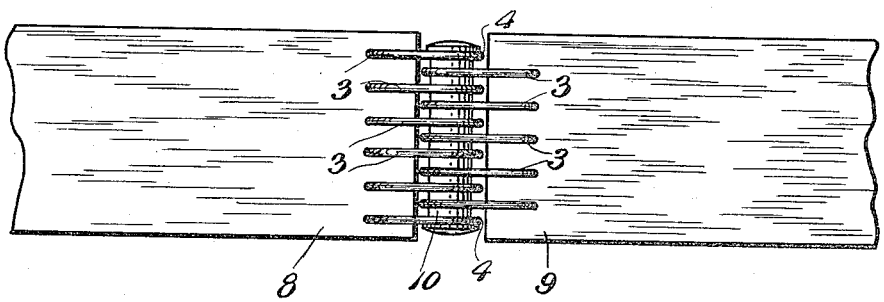
Figure 4:
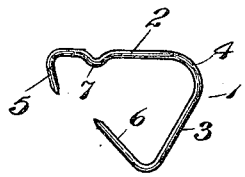
Figure 6:
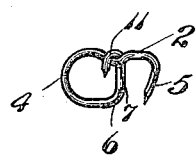
Figure 5:
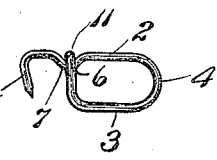

Other objects and advantages of the invention will appear and the novel construction and attachment of the hook to a belt will be evident as the description progresses of the embodiment illustrated in the accompanying drawings, in which, Figure 1 is a view showing the attachment of two separated ends of a belt by use of my improved belt hooks. Fig. 2 is a section taken longitudinally thereof. Fig. 3 is a view similar to Fig. 1 but from the opposite side of the belt. Fig. 4 is an elevation of the belt fastener used previous to its connection or attachment to the belt. Fig. 5 illustrates in side elevation the form which the fastener takes when it is secured to the belt; and Fig. 6 is a perspective view of the construction appearing in Fig. 5.

Similar reference characters refer to similar parts throughout the several views of the drawing.

The fastener is indicated as a whole at 1 and may be preferably formed of wire. It comprises in its construction a long arm 2 and a shorter arm 3 integrally connected by a curved section at 4. At its end the long arm 2 terminates in a sharpened prong 5 of comparatively short length while the shorter arm 3 terminates in a similar prong 6 longer than prong 5. Between prong 5 and the curved section 4 arm 2 is formed with a bend as shown at 7 making a slight depression in one side of the arm.

Hooks of this construction are secured at the ends of a belt like those shown at 8 and 9, the curved section 4 of the hooks passing around a hinge pin 10. In securing a hook to a belt end, the prong 5 is driven into the belt and is of such length that it passes substantially therethrough terminating just underneath the opposite surface thereof. The arm 2 lies along one side of the belt with the bend 7 pressed into the belting material, arm 3 returning and lying against the other side as shown while the longer prong 6 is passed through the belt and its end turned around the longer arm 2 to form a hook 11 which seats in the recess formed at the bend 7. A plurality of these hooks are thus secured to each of the ends 8 and 9. In securing the hooks to the belt ends they are properly spaced that the hooks on one belt end will pass between the hooks on the other end and with all of them turned around the hinge pin 10, a secure yet flexible connection of the ends of the belt is obtained. From this construction it will be apparent that a hook secured to a belt as described cannot be withdrawn from the belt without the destruction of the fabric thereof.

Heretofore belt hooks have been made having arms similar to arms 2 and 3 in the present construction but each provided with prongs similar to the prong 5 of arm 2 which are merely inserted into the belt the same as prong 5 is in the present construction. In the use of a belt a considerable and changing strain results which, many times, when the old form of hook is used, results in pulling the hooks out of the belt, the prongs yielding especially after the belt has been used for some time and being thus subject to withdrawal. With my belt hooks, prongs 6 passing through the belt and its end turned around and hooked over the opposite arm at the depression at 7, provides an absolutely sure and substantially indestructible lock holding the oppositely extending arms of the belt hook together and insuring against their separation and removal of the hook from a belt to which it has been attached except by tearing out the ends of the belt as will be apparent; while prong 5 is held embedded in the belt at all times and cannot give to release the hook as in many other constructions of belt hooks.

Various modifications in detail may be resorted to without departing from the invention defined in the appended claims which cover all modifications falling within their scope.

I claim:—

1. A belt hook comprised of a long and a short arm said arms being spaced apart and extending in substantially the same direction and connected by a curved section, a comparatively short prong at the end of the long arm bent at an angle thereto, a comparatively long prong at the end of the short arm also bent at an angle thereto and extending toward the short arm, and a bend in the long arm forming a depression at a point substantially opposite the end of the short arm.

2. A belt hook comprised of long and short arms connected by an integral curved section, the arms adapted to lie on opposite sides of a belt and the curved section adapted to extend beyond the end of the belt, a short prong turned at an angle from the long arm adapted to be embedded in the belt, and a long prong turned at an angle from the short arm adapted to be passed through the belt and turned at its end around the long arm.

In testimony whereof I affix my signature in presence of two witnesses.

ADOLPH SCHNEIDER.

Witnesses:
FRANK E. LIVERANCE, Jr.,
H. H. YARRINGTON.

Copies of this patent may be obtained for five cents each, by addressing the "Commissioner of Patents, Washington, D. C."